(12) United States Patent
Ran et al.

(10) Patent No.: US 11,039,373 B2
(45) Date of Patent: Jun. 15, 2021

(54) SYSTEM AND METHOD TO IMPLEMENT SCAN ON WIRELESS COMPOSITE DEVICE

(71) Applicant: Hewlett Packard Enterprise Development LP, Houston, TX (US)

(72) Inventors: Guangzhi Ran, Beijing (CN); Qiang Zhou, Beijing (CN); Jianpo Han, Beijing (CN)

(73) Assignee: Hewlett Packard Enterprise Development LP, Houston, TX (US)

(*) Notice: Subject to any disclaimer, the term of this patent is extended or adjusted under 35 U.S.C. 154(b) by 107 days.

(21) Appl. No.: 16/547,186

(22) Filed: Aug. 21, 2019

(65) Prior Publication Data

US 2021/0058850 A1 Feb. 25, 2021

(51) Int. Cl.
*H04L 12/28* (2006.01)
*H04W 48/08* (2009.01)
*H04W 72/12* (2009.01)
*H04W 84/12* (2009.01)

(52) U.S. Cl.
CPC ....... *H04W 48/08* (2013.01); *H04W 72/1273* (2013.01); *H04W 84/12* (2013.01)

(58) Field of Classification Search
CPC . H04W 48/08; H04W 72/1273; H04W 84/12; H04W 88/08; H04W 56/0005; H04W 56/0045; H04W 56/009; H04W 28/0231; H04W 36/0044; H04W 36/0094; H04W 36/18; H04L 43/0882; H04L 43/16; H04L 5/0055; H04L 69/18; H04L 67/104; H04L 67/18; H04L 12/18; H04L 12/1818; H04L 41/00; H04L 41/0809; H04L 41/12; H04L 41/22; H01Q 1/242; H01Q 3/00; H04M 1/72525; H04M 1/72563; H04M 1/72572; H04M 1/72577
See application file for complete search history.

(56) References Cited

U.S. PATENT DOCUMENTS

| | | | |
|---|---|---|---|
| 6,327,468 B1 * | 12/2001 | van Iersel | H04W 16/16 455/434 |
| 7,899,396 B2 * | 3/2011 | Meylan | H04W 74/0808 455/41.2 |
| 8,107,882 B2 * | 1/2012 | Fischer | H04W 72/1215 455/63.1 |
| 8,199,737 B2 | 6/2012 | Sakoda | |
| 8,588,698 B2 * | 11/2013 | Brisebois | H04W 88/06 455/63.1 |
| 8,611,268 B1 | 12/2013 | Thandaveswaran | |
| 9,730,014 B2 * | 8/2017 | Balaban | H04W 4/025 |

(Continued)

*Primary Examiner* — Stephen M D Agosta
(74) *Attorney, Agent, or Firm* — Jaffery Watson Mendonsa & Hamilton

(57) ABSTRACT

In one example a computer implemented method comprises estimating, in a processor communicatively coupled to a wireless client of a composite device, a first transmission time for an uplink beacon from a first access point communicatively coupled to the wireless client, scheduling, in the processor, a second transmission time for a beacon from a local access point of the composite device, and defining a scan window during which scan operations for the wireless client of the composite device and the local access point of the composite device are to occur, the scan window offset from the second transmission time by a first time buffer.

17 Claims, 8 Drawing Sheets

(56) References Cited

U.S. PATENT DOCUMENTS

| | | | |
|---|---|---|---|
| 10,165,477 B2 | 12/2018 | Dayanandan et al. | |
| 2002/0114303 A1* | 8/2002 | Crosbie | H04B 7/269 370/338 |
| 2002/0114304 A1* | 8/2002 | Hur | H04W 48/16 370/338 |
| 2005/0026637 A1* | 2/2005 | Fischer | H04W 72/1215 455/502 |
| 2005/0177639 A1* | 8/2005 | Reunamaki | H04W 84/18 709/227 |
| 2007/0281617 A1* | 12/2007 | Meylan | H04W 16/14 455/41.2 |
| 2008/0205365 A1* | 8/2008 | Russell | H04W 88/06 370/341 |
| 2009/0135780 A1* | 5/2009 | Kitchin | H04W 16/14 370/329 |
| 2010/0048212 A1* | 2/2010 | Yavuz | H04W 52/325 455/436 |
| 2010/0284380 A1* | 11/2010 | Banerjee | H04W 16/14 370/338 |
| 2011/0274021 A1* | 11/2011 | He | H04W 52/0238 370/311 |
| 2012/0208528 A1* | 8/2012 | Wilhelmsson | H04W 48/16 455/423 |
| 2014/0301375 A1 | 10/2014 | Nusairat et al. | |
| 2014/0355621 A1* | 12/2014 | Katar | H04B 3/544 370/443 |
| 2015/0382304 A1* | 12/2015 | Park | H04W 52/0248 455/41.2 |
| 2017/0188264 A1* | 6/2017 | Hwang | H04W 52/362 |
| 2018/0063742 A1 | 3/2018 | Jia et al. | |
| 2018/0220368 A1 | 8/2018 | Gidvani et al. | |

\* cited by examiner

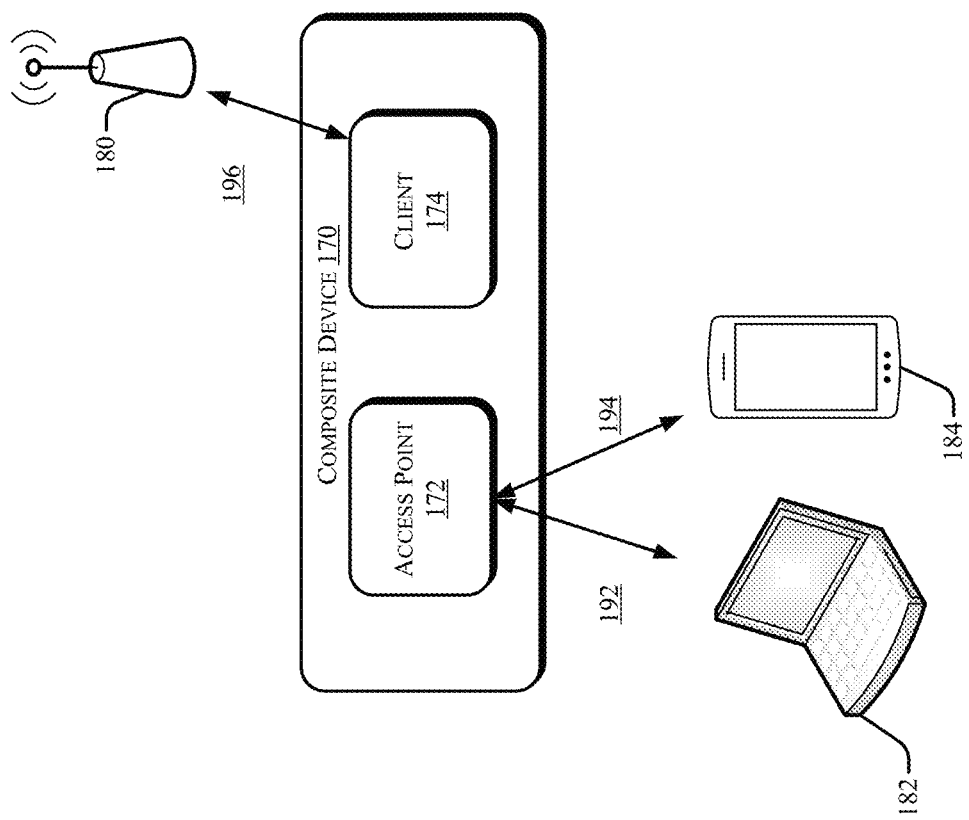

SYSTEM AND METHOD TO IMPLEMENT SCAN ON WIRELESS COMPOSITE DEVICE

BACKGROUND

Subject matter described herein relates generally to the field of electronic communication and more particularly to electronic communication networks.

Many wireless networks utilize access points to provide connectivity to client devices, also referred to as stations. Devices referred to as composite devices, which include both a client device and an access point, are being introduced into wireless networks. In some composite devices operations of the client device may interfere with scan functions of the access point. Similarly, operations of the access point may interfere with scan functions of the client device.

Accordingly, techniques to implement scan operations on a wireless composite device may find utility.

BRIEF DESCRIPTION OF THE DRAWINGS

Embodiments described here are illustrated by way of example, and not by way of limitation, in the figures of the accompanying drawings in which like reference numerals refer to similar elements.

FIG. 1B is a schematic illustration of a composite device in accordance with some embodiments.

DETAILED DESCRIPTION

Figure 1A:
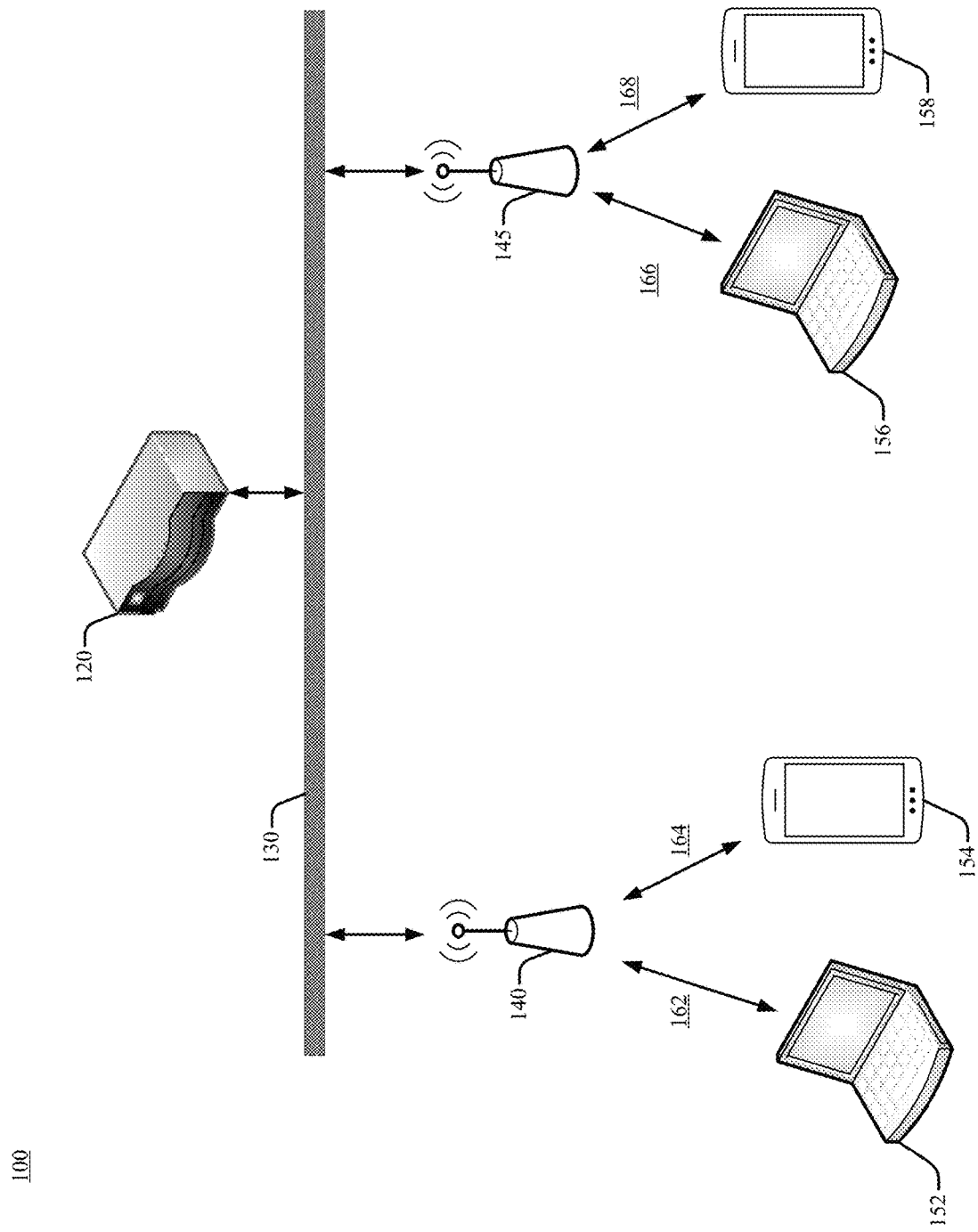
FIG. 1A is a schematic illustration of a wireless networking environment in accordance with some embodiments.

Described herein are exemplary systems and methods to implement scanning on a composite device. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the examples.

Wireless communication networks may be deployed to provide various types of communication to multiple users propagated via electromagnetic waves. As a result, various types of communication may be implemented by and between multiple users without the use of cables, wires, or other physical electric conductors to couple devices in the wireless network. Examples of the various types of communication that may be provided by wireless networks include voice communication, data communication, multimedia services, etc.

An example of a wireless communication network is a wireless local area network (WLAN). As used herein, the term "wireless local area network (WLAN)" can, for example, refer to a communication network that provides a communication link between two or more devices within a coverage area. WLANs such as those defined in the IEEE wireless communication standards, e.g., IEEE 802.11a, IEEE 802.11n, IEEE 802.11 ac, 802.11ax can use various wireless encoding techniques, for example, spread spectrum, orthogonal frequency division multiplexing (OFDM), a single-in-single-out (SISO), and/or a multiple-in-multiple-out (MIMO) communication techniques to encode a signal which is then transmitted by a radio transmitter.

Wireless networks typically provide a communication connection to a network via one or more access points (APs), thereby providing users with the mobility to move within a local coverage area while remaining connected to the network. WLANs may include multiple stations, controllers (e.g., WLAN controller(s)), and/or access points that may communicate over one or more wireless channels.

As used herein, an access point (AP) can be a networking hardware device that allows a wireless-compliant device (e.g., a station) to connect to a network, while a controller may perform configuration operations and/or authentication operations on access points and/or station. An access point can refer to receiving points for any known or convenient wireless access technology which may later become known. Specifically, the term access point is not intended to be limited to IEEE 802.11-based access points.

As used herein, a station can be a device that has the capability to use the Institute of Electrical and Electronics Engineers (IEEE) 802.11 protocol. Examples of stations include smart phones, laptops, physical non-virtualized computing devices, personal digital assistants, etc. In some examples, a station may be a device that contains an IEEE 802.11-conformant media access control (MAC) and physical layer (PHY) interface to a wireless medium (WM). As used herein, an access point (AP) can refer to receiving points for any known or convenient wireless access technology which may later become known. Specifically, the term AP is not intended to be limited to IEEE 802.11-based APs.

As used herein, a network device can include a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. The network device may be adapted with circuitry to support wireless connectivity with other network devices being part of a wireless network.

FIG. 1A is a schematic illustration of a wireless communication environment in accordance with some embodiments. Referring to FIG. 1A, in some examples a wireless networking environment includes a wireless local area network (WLAN) 100, and optionally a network controller 120, which are coupled to other network devices such as access point 140 and access point 145 via wired network 130. Also, access point 140 can be coupled to one or more client devices 152 and 154 via wireless communication links 162 and 164 respectively. Likewise, access point 145 can be coupled to one or more client devices 156 and 158 via wireless communication links 166 and 168 respectively.

Access points 140 and 145 are hardware units that act as communication nodes by linking wireless mobile stations, such as personal computers, to a wired backbone network. Access point 140 or 145 may connect client devices or users to other client devices or users in the network. Also, access point 140 or 145 may serve as a point of connection between WLAN 100 and wired network 130.

Access point 140 or 145 may generally broadcast a service set identifier (SSID). In particular, access point 140 or 145 may be quality of service (QoS) enhanced access points that are capable of broadcasting QoS basic service set (QBSS). Specifically, additional information, such as QBSS parameters, may be added to the beacon frames or probe requests/response to advertise channel load information. Such additional information allows access points 140 and/or 145 to deckle whether to accept an admission control request. The additional information also allows wireless devices 152-158 to decide which of the available access points 140 and 145 they should choose to associate with.

Access point 140 or 145 may have one or more radios. The radios may be configured to communicate with various wireless devices is wireless links 162-168, which support wireless communication standards. In particular, the radios may include multiple antennas to support Institute of Electrical and Electronics Engineers (IEEE) 802.11 wireless networking standards, Worldwide Interoperability for Microwave Access standards (WiMAX), 4th Generation cellular wireless standards (4G), 3rd Generation Partnership Project Long Term Evolution (3GPP LTE), and Evolved High-Speed Packet Access (HSPA+).

In some embodiments, access point 140 or 145 performs media access control (MAC) processing functions. In some embodiments, controller 120 performs some MAC processing functions. In some embodiments, the MAC processing functions are split between access points 140 and/or 145 and controller 120. The MAC processing functions include, for example, terminating the wireless transmission data and management protocols, translating data between the wired and wireless portions of the network, maintaining statistical information regarding wireless clients and the radio environment, and so on.

Wireless clients 152-158 may be any computing device that includes a network communication interlace, which is capable of wireless communications. For example, wireless clients 152-158 can be, but are not limited to, smart mobile phone, laptop or tablet computing device, personal desktop or workstation, etc.

Wired network 130 generally include any type of network which involves transmission of data over a wire-based communication technology, for example, Ethernet, fiber-optic communication networks, cable networks, telephone networks, electromagnetic networks, etc.

Network controller 120 can be any hardware or software module or any combination thereof, which provides one or more of such functionalities as network configuration, network performance monitoring, network security, network fault management, network accounting management, etc. Note that, although only one controller is depicted in FIG. 1A, a network in accordance with the present disclosure may include multiple controllers which collaboratively manage a plurality of network devices such as access points. Moreover, when a network includes multiple controllers, one controller may be elected or selected as a master controller to manage other controllers. Also, note that controller 120 can be a virtual controller, which operates on one or more access points in a wireless network. The virtual controller may be elected among the one or more access points or configured by a network administrator.

FIG. 1B is a schematic illustration of a wireless composite device 170 in accordance with some embodiments. Examples of composite devices may include an access point which includes a WiFi uplink, a meshpoint node, a wireless repeater, and a wireless bridge. In some examples, the composite device 170 comprises an access point 172 and a client device 174. The access point 172 may offer network access functionality in a manner analogous to access points 140, 145 described with reference to FIG. 1A. Thus, access point 172 can be coupled to one or more client devices 182 and 184 via wireless communication links 192 and 194 respectively. Client device 174 may be communicatively coupled to a separate access point 180 via a wireless communication link 196.

As described above, in some composite devices operations of the client device may interfere with scan functions of the access point. For example, the client device 174 may initiate scan operations to discover other access points in the network. The scan operation initiated by the client device 174 may cause the access point 172 to miss transmitting its beacon. Similarly, the access point 172 initiate scan operations, which may cause the client device 174 to lose buffered data.

To address these issues, subject matter described herein enables a controller associated with a composite device to estimate a first transmission time for an uplink beacon from a first access point communicatively coupled to the wireless client device, schedule a second transmission time for a beacon from the access point of the composite device, and define a scan window during which scan operations for the wireless client of the composite device and the local access point of the composite device are to occur. In some examples the scan window is offset from the second transmission time by a time buffer.

Figure 2A:
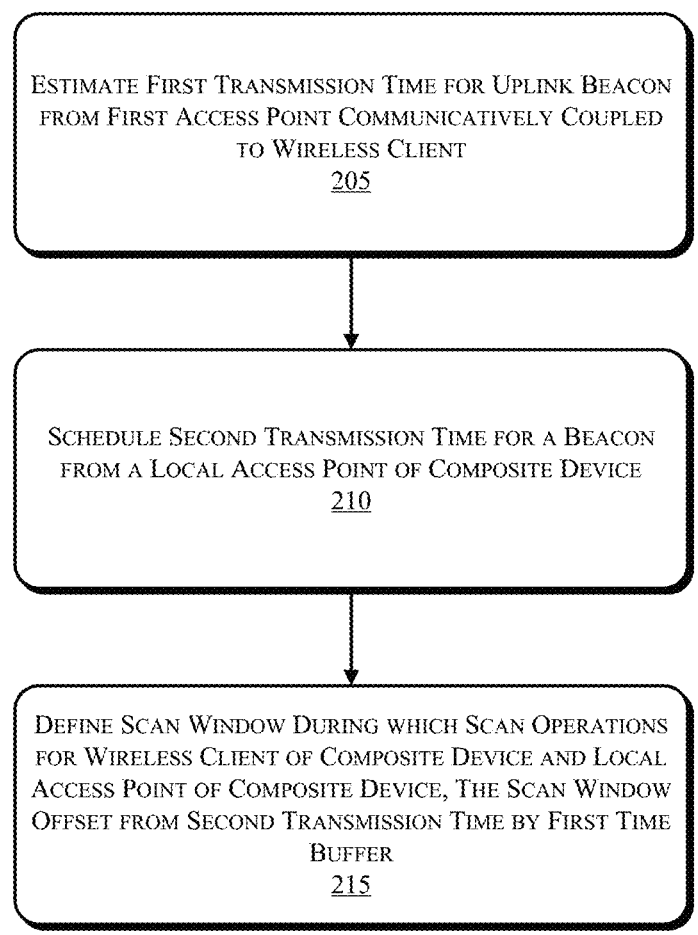
FIG. 2A is a flow diagram of a method to implement scanning on a composite device in accordance with some embodiments.
Figure 3:
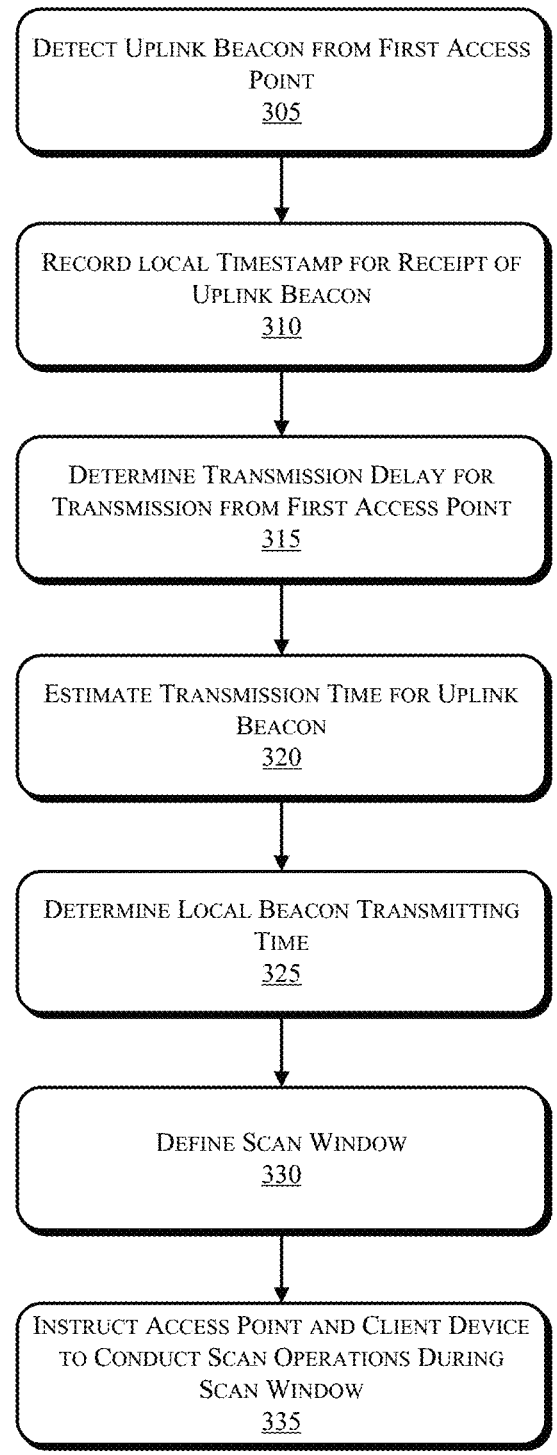
FIG. 3 is a flow diagram of a method to implement scanning on a composite device in accordance with some embodiments
Figure 4:
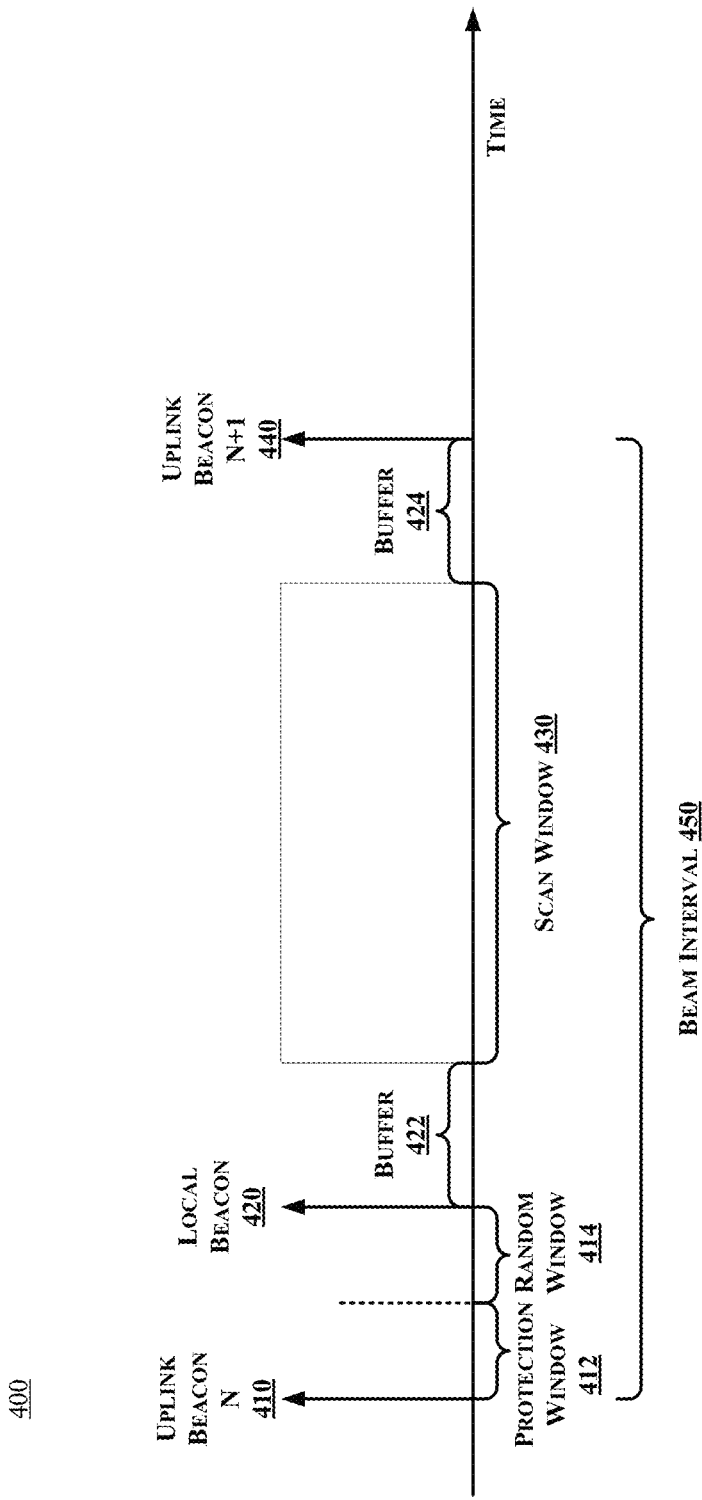
FIG. 4 is a schematic illustration of a timing diagram in a method to implement scanning on a composite device in accordance with at least one embodiment.

Operational details will be described in greater detail with reference to FIGS. 2A, 2B, 3 and 4. FIG. 2A and FIG. 3 are flow diagrams of a method to implement scanning on a wireless composite device, in accordance with an embodiment. In some examples the operations depicted in FIG. 2A and FIG. 3 may be implemented by a controller in a wireless composite device 170. In other examples the operations depicted in FIG. 2A and FIG. 3 may be implemented by a network controller such as network controller 120 depicted in FIG. 1A. FIG. 4 is a schematic illustration of a timing diagram in a method to implement scanning on a composite device in accordance with an embodiment.

Referring to FIG. 2A, at operation 205 the controller estimates a first transmission time for an uplink beacon from the access point 180 to the wireless client device 174. At operation 210 the controller schedules a second transmission time for a beacon from the access point 172 of the composite device 170. At operation 215 the controller defines a scan window during which scan operations for the access point 172 and the wireless client 174 of the composite device are to be conducted. The controller generates a time buffer to offset the scan window from the second transmission time. Scan operations for both the access point 172 and the client 174 are to be conducted during the scan window. Aspects of the method are described in greater detail with reference to the operations depicted in FIG. 3 and the timing diagram 400 depicted in FIG. 4.

Referring to FIG. 3, at operation 305 the controller detects a beacon transmitted from the access point 180. In some examples the access point 180 may be referred to as an uplink access point and the beacon may be referred to as an uplink beacon. At operation 310 the controller records a local timestamp for the receipt of the uplink beacon. At operation 315 the controller determines the transmission delay for a signal transmitted from the access point 180 to the wireless client 174. In some examples the delay may be determined by three factors. The first is the beacon frame duration. The beacon frame has a length which may be measured in bits. The transmitter side may transmit the beacon frame bit-by-bit. The receiver side does not receive the complete frame until the last bit is received. The beacon frame duration is equal to beacon frame length (in bits) divided by the beacon frame transmitting rate, typically 6 Mbps or 1 Mbps. For example, duration of a beacon with 128 bytes might be (128*8/1 Mbps)=1024 microseconds in 2.4G band or 170 microseconds in 5G band. This duration is typically a few hundreds of microseconds, i.e., much less than 2 ms.

The second factor is the beacon propagation delay. All the bits in a frame are transmitted via electromagnetic wave, so there is a very short delay in typical distance between two WLAN device, usually a few nanoseconds.

The third factor is the software processing delay. After a beacon frame is received by the radio hardware, the radio hardware will interrupt the CPU, and then software will process the beacon frame. This is also a short delay, which varies when CPU load and CPU capability is different, of between a few microseconds to approximately 100 microseconds.

At operation 320 the transmission time for the uplink beacon at the local clock is estimated. In some examples the local timestamp of the uplink beacon may be aligned to a beacon interval and the Time Synchronization Function (TSF) of the beacon as indicated in Equation 1:

$$(t_{uplink\_beacon} = t_{rx\_uplink\_beacon} - \text{delay}) \% \text{beacon\_interval,TSF}) \quad \text{EQ 1}$$

In equation 1, $t_{rx\_uplink\_beacon}$ represents the timestamp when the uplink beacon is received, as measured with the local clock, TSF represents TSF timestamp in the uplink beacon frame body, which is measured with the clock of the uplink access point 180, and the delay represents the beacon duration and the propagation time of the signal from the access point 180 to the wireless client 174. Thus, the equation determines, $t_{uplink\_beacon}$ which is an estimate of the transmitting time of the uplink beacon as measured by the local clock. This is illustrated as Uplink Beacon N 410 in the timing diagram of FIG. 4.

At operation 325 a local beacon transmitting time is determined. In one example the local beacon transmitting time may be determined using equation 2:

$$t_{local\_beacon} = t_{uplink\_beacon} \pm (t_{protection\_window} + t_{random\_window}) \quad \text{EQ 2}$$

In equation 2, $t_{protection\_window}$ represents a time buffer which is used to allow buffered frames burst transmission from the access point 180, and $t_{random\_window}$ represents a time buffer which allows multiple wireless composite devices to work with the same access point 180. This is illustrated as the local beacon 420 in the timing diagram of FIG. 4, which is offset from the uplink beacon 410 by the protection window 412 and the random window 414. An example protection window may measure 10 ms, but values in a range between 5 ms and 15 ms are also suitable. Similarly, the random window may be structured as a pseudorandom number in a range between 0 ms and 20 ms.

At operation 330 the controller defines a scan window during which scan operations are to take place. As illustrated in FIG. 4, the scan window 430 is scheduled to be offset from the local beacon 420 by a first-time buffer 422 and offset from the transmission time of the next uplink beacon 440 by a second time buffer 424. In one example the buffers may measure 5 ms in duration. In other examples the buffers may be in a range between 0 ms and 10 ms.

At operation 335 the controller instructs the access point 172 and the client device 174 of the composite device 170 to schedule scan operations only during the scan window 430. Thus, as illustrated in FIG. 4, scheduling scan operations during the scan window 430 will limit scan operations to time period in which they do not interfere with either receiving the uplink beacon from the access point 180 or with transmitting a local beacon from the client device 174.

By way of example, a beacon interval 450 may be 102 millisecond (ms). If the uplink beacon is transmitted at a time of 10 milliseconds and the protection window 412, random window 414, and buffers 422, 424 are set to 5 ms, then the local beacon 420 may be transmitted at 20 ms and the scan window may be set to begin at approximately 25 ms and to end at approximately 95 ms.

Figure 2B:
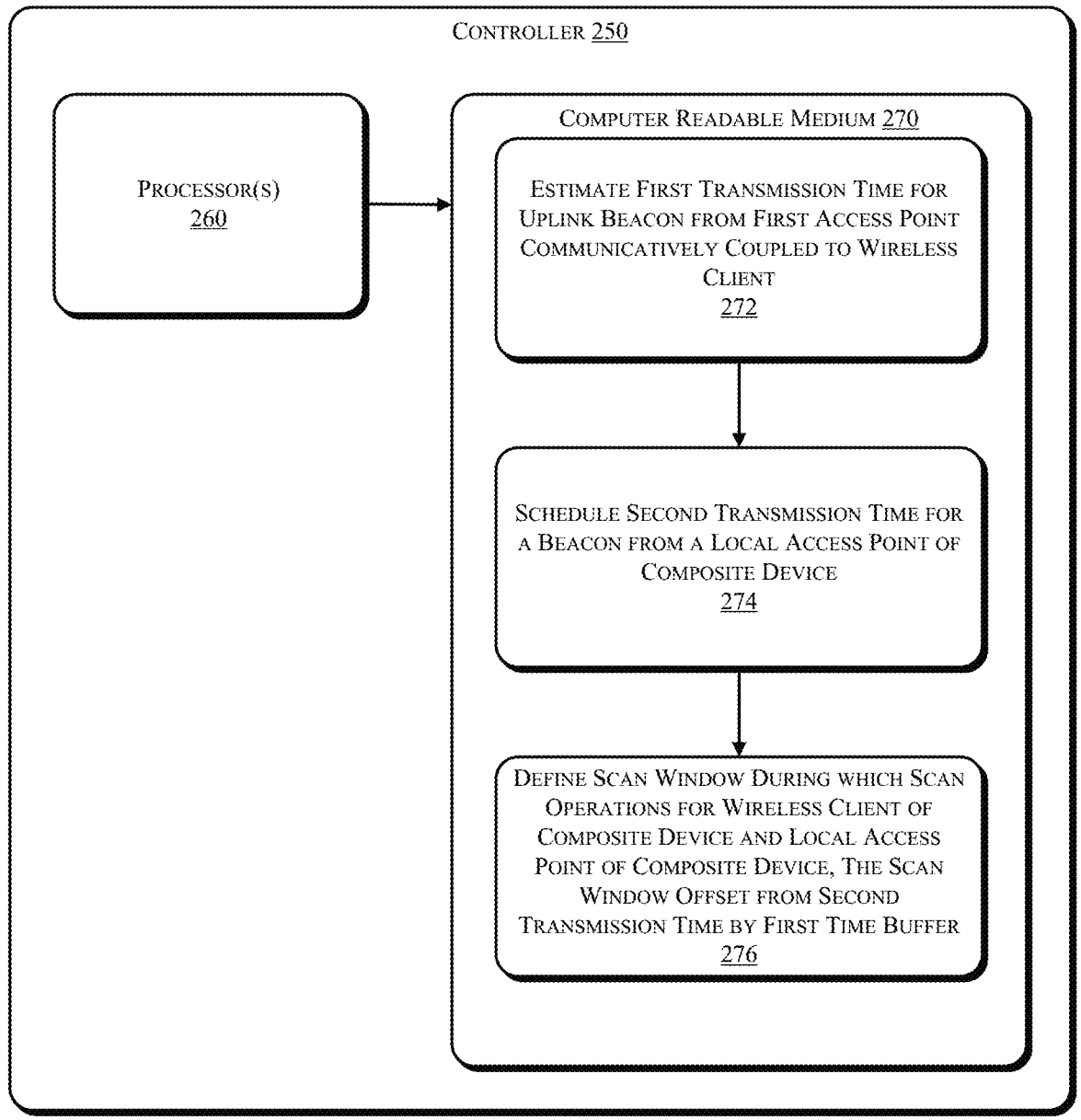
FIG. 2B is a schematic illustration of a controller comprising a processor and a non-transitory computer readable medium comprising instructions to implement a method for scanning on a composite device in accordance with some embodiments.

FIG. 2B is a schematic illustration of a controller 250 comprising one or more processors 260 and a non-transitory computer readable medium 270 comprising instructions to implement a method for scanning on a composite device in accordance with some embodiments. Processor 260 may be a central processing unit (CPU), microprocessor, and/or other hardware device suitable for retrieval and execution of instructions such as those stored in non-transitory computer readable medium 211. The non-transitory machine readable medium 270 may be any type of volatile or non-volatile memory or storage, such as random access memory (RAM), flash memory, read-only memory (ROM), storage volumes, a hard disk, or a combination thereof.

In various examples the medium 270 may store instructions 272 which may be executed by the processor(s) 260 to estimate a first transmission time for an uplink beacon from the access point 180 to the wireless client device 174, instructions 274 which may be executed by the processor(s) 260 to schedule a second transmission time for a beacon from the access point 172 of the composite device 170, and instructions 276 which may be executed by the processor(s) 260 to define a scan window during which scan operations for the access point 172 and the wireless client 174 of the composite device are to be conducted. The instructions 276 may cause the processor to generate a time buffer to offset the scan window from the second transmission time. Scan operations for both the access point 172 and the client 174 are to be conducted during the scan window.

Figure 5:
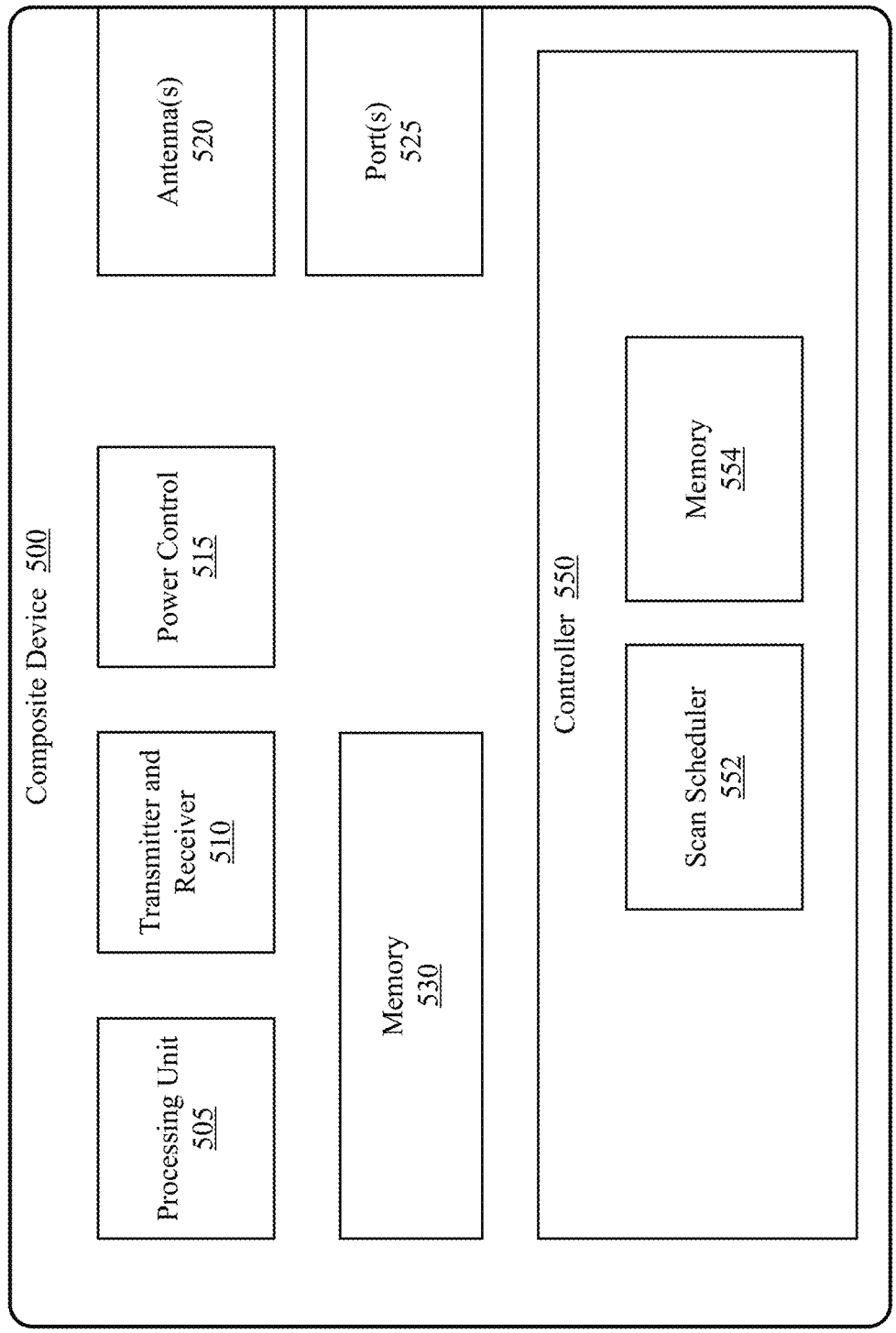
FIG. 5 is a schematic illustration of an access point for a wireless communication network in accordance with some embodiments.

FIG. 5 is block diagram to illustrate an access point which may be adapted to provide scanning according to some embodiments. Composite device 500 may include additional components and elements not illustrated in FIG. 5, which is simplified for sake of illustration. The illustrated composite device 500 may include an access point (such as an enterprise access point) operating under IEEE 802.11ac or 802.11ax standards, and may represent the access points 172 depicted in FIG. 1B.

In some embodiments, the composite device 500 includes a processing unit 505, a transmitter and receiver 510, power control 515, one or more antennas 520 for wireless signal communication, and one or more ports 525 for network connections or other connections. The composite device 500 may further include memory 530 for storage of data, which may include volatile and nonvolatile memory (including flash memory and similar elements), registers, and other storage technologies.

In some embodiments, the composite device 500 In some embodiments, the access point 500 further includes a controller 550 which may be implemented as hardware, firmware or as logic instructions which execute on a processor, or both combinations thereof. In some examples the controller includes a scan scheduler 552 that implements the operations depicted in FIG. 2A and FIG. 3, and a memory 554 that may be used to store data associated with the operations depicted in FIG. 2A and FIG. 3.

Figure 6:
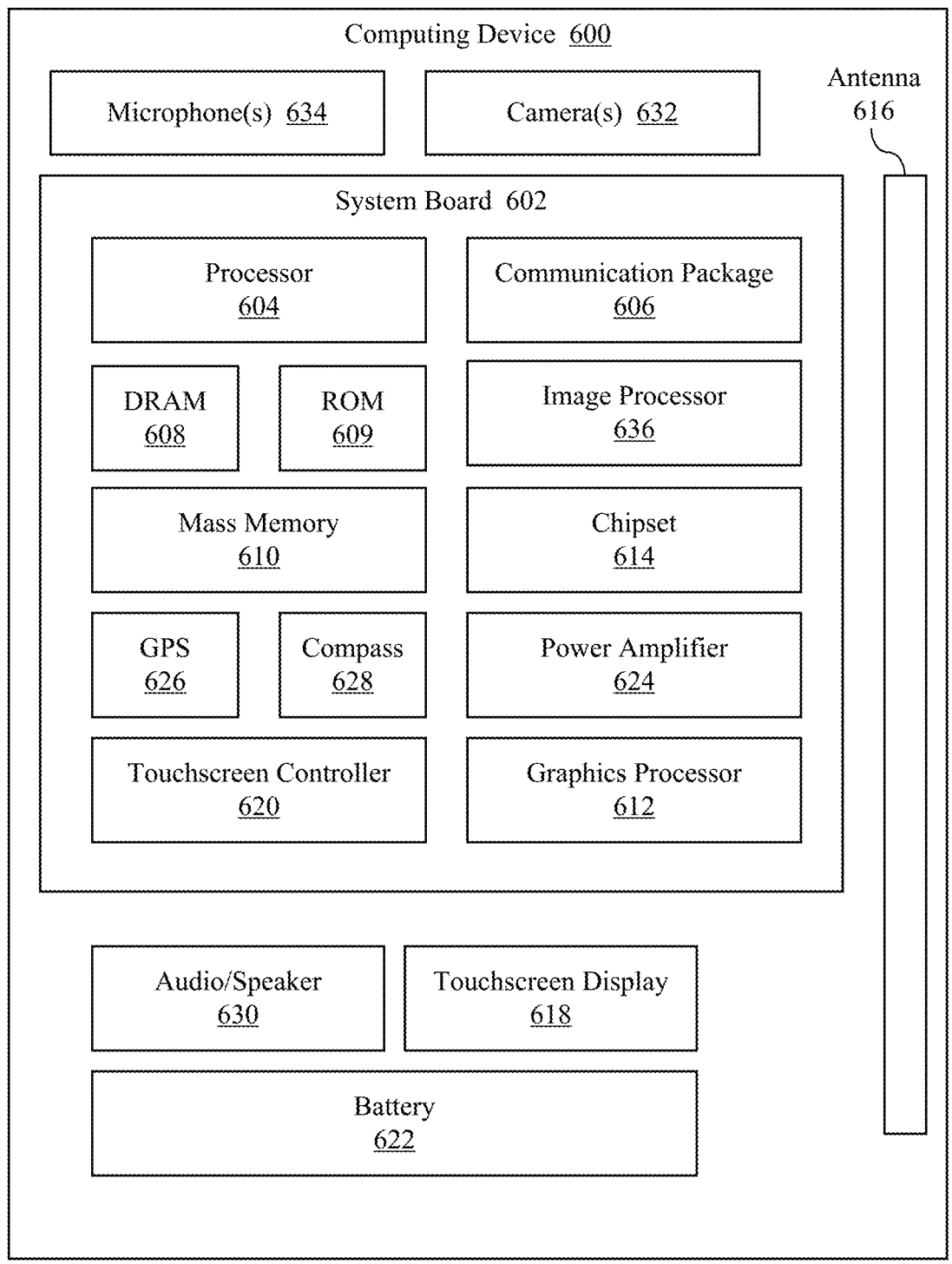
FIG. 6 is a schematic illustration of an access point for a wireless communication network in accordance with some embodiments.

FIG. 6 illustrates a computing device according to some embodiments. In some embodiments, the computing device may include a device to communicate with an access point in network. Computing device 600 houses a system board 602 (which may also be referred to as a motherboard, main circuit board, or other terms). The board 602 may include a number of components, including but not limited to a processor 604 and at least one communication package or chip 606. The communication package 606 is coupled to one or more antennas 616. The processor 604 is physically and electrically coupled to the board 602.

Depending on its applications, computing device 600 may include other components that may or may not be physically and electrically coupled to the board 602. These other components include, but are not limited to, volatile memory (e.g., DRAM) 608, nonvolatile memory (e.g., ROM) 609, flash memory (not shown), a graphics processor 612, a digital signal processor (not shown), a crypto processor (not shown), a chipset 614, an antenna 616, a display 618 such as a touchscreen display, a touchscreen controller 620, a battery 622, an audio codec (not shown), a video codec (not shown), a power amplifier 624, a global positioning system (GPS) device 626, a compass 628, an accelerometer (not shown), a gyroscope (not shown), a speaker or other audio element 630, one or more cameras 632, a microphone array 634, and a mass storage device (such as hard disk drive) 610, compact disk (CD) (not shown), digital versatile disk (DVD) (not shown), and so forth). These components may be connected to the system board 602, mounted to the system board, or combined with any of the other components.

The communication package 606 enables wireless and/or wired communications for the transfer of data to and from the computing device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 606 may implement any of a number of wireless or wired standards or protocols, including but not limited to Wi-Fi (IEEE 802.11 family), WiMAX (IEEE 802.16 family), IEEE 802.20, long term evolution (LTE), Ev-DO (Evolution Data Optimized), HSPA+, HSDPA+, HSUPA+, EDGE Enhanced Data rates for GSM evolution), GSM (Global System for Mobile communications), GPRS (General Package Radio Service), CDMA (Code Division Multiple Access), TDMA (Time Division Multiple Access), DECT (Digital Enhanced Cordless Telecommunications), Bluetooth, Ethernet derivatives thereof, as well as any other wireless and wired protocols that are designated as 3G, 4G, 5G, and beyond. The computing device 600 may include a plurality of communication packages 606. For instance, a first communication package 606 may be dedicated to shorter range wireless communications such as Wi-Fi and Bluetooth and a second communication package 606 may be dedicated to longer range wireless communications such as GSM, EDGE, GPRS, CDMA, WiMAX, LTE, Ev-DO, and others.

In various implementations, the computing device 600 may be a laptop, a netbook, a notebook, a smartphone, a tablet, a personal digital assistant (PDA), an ultra-mobile PC, a mobile phone, a desktop computer, a server, a set-top box, an entertainment control unit, a digital camera, a portable music player, or a digital video recorder. The computing device may be fixed, portable, or wearable. In further implementations, the computing device 600 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A controller, comprising:
    a processor; and
    a memory communicatively coupled to the processor and comprising instructions which, when executed by the processor, configure the processor to perform operations, comprising:
        estimating a first transmission time for an uplink beacon from a first access point communicatively coupled to a wireless client of a composite device;
        scheduling a second transmission time for a beacon from a local access point of the composite device, wherein the second transmission time is offset from the first transmission time by a protection time buffer and a pseudo-random time buffer; and
        defining a scan window during which scan operations for the wireless client of the composite device and the local access point of the composite device are to occur, the scan window offset from the second transmission time by a first time buffer.

2. The controller of claim 1, further comprising instructions which, when executed by the processor, configure the processor to perform operations, comprising:
    detecting an uplink beacon from the first access point;
    recording a local timestamp associated with receipt of the uplink beacon; and
    determining a transmission delay for a transmission from the first access point.

3. The controller of claim 1, wherein the protection buffer is set to a value that allows buffered frames to be transmitted in bursts from the uplink access point.

4. The controller of claim 1, further comprising instructions which, when executed by the processor, configure the processor to perform operations, comprising:
    scheduling at least one scan operation for the wireless client during the scan window.

5. The controller of claim 1, further comprising instructions which, when executed by the processor, configure the processor to perform operations, comprising:
    scheduling at least one scan operation for the local access point during the scan window.

6. A computer-implemented method, comprising:
    estimating, in a processor communicatively coupled to a wireless client of a composite device, a first transmission time for an uplink beacon from a first access point communicatively coupled to the wireless client;
    scheduling, in the processor, a second transmission time for a beacon from a local access point of the composite device, wherein the second transmission time is offset from the first transmission time by a protection time buffer and a pseudo-random time buffer; and
    defining a scan window during which scan operations for the wireless client of the composite device and the local access point of the composite device are to occur, the scan window offset from the second transmission time by a first time buffer.

7. The computer-implemented method of claim 6, further comprising:
    detecting an uplink beacon from the first access point;
    recording a local timestamp associated with receipt of the uplink beacon; and
    determining a transmission delay for a transmission from the first access point.

8. The computer-implemented method of claim 6, wherein the protection buffer is set to a value that allows buffered frames to be transmitted in bursts from the uplink access point.

9. The computer-implemented method of claim 6, further comprising scheduling at least one scan operation for the wireless client during the scan window.

10. The computer-implemented method of claim 6, further comprising scheduling at least one scan operation for the local access point during the scan window.

11. A non-transitory computer-readable medium comprising logic instructions which, when executed by a processor, configure the processor to perform operations comprising:
    estimating, in a processor communicatively coupled to a wireless client of a composite device, a first transmission time for an uplink beacon from a first access point communicatively coupled to the wireless client;
    scheduling, in the processor, a second transmission time for a beacon from a local access point of the composite device, wherein the second transmission time is offset from the first transmission time by a protection time buffer and a pseudo-random time buffer; and
    defining a scan window during which scan operations for the wireless client of the composite device and the local access point of the composite device are to occur, the scan window offset from the second transmission time by a first time buffer.

12. The non-transitory computer-readable medium of claim 11, further comprising logic instructions which, when executed by the processor, configure the processor to perform operations comprising:
    detecting an uplink beacon from the first access point;
    recording a local timestamp associated with receipt of the uplink beacon; and
    determining a transmission delay for a transmission from the first access point.

13. The non-transitory computer-readable medium of claim 11, wherein the protection buffer is set to a value that allows buffered frames to be transmitted in bursts from the uplink access point.

14. The non-transitory computer-readable medium of claim 11, further comprising logic instructions which, when executed by the processor, configure the processor to perform operations comprising scheduling at least one scan operation for the wireless client during the scan window.

15. The non-transitory computer-readable medium of claim 11, further comprising logic instructions which, when executed by the processor, configure the processor to perform operations comprising scheduling at least one scan operation for the local access point during the scan window.

16. The non-transitory computer-readable medium of claim 11, wherein the protection time buffer measures between 5 milliseconds and 15 milliseconds.

17. The non-transitory computer-readable medium of claim 11, wherein the pseudo-random time buffer measures between 0 milliseconds and 20 milliseconds.

* * * * *